(12) United States Patent
Sherman et al.

(10) Patent No.: US 9,398,129 B1
(45) Date of Patent: Jul. 19, 2016

(54) T-COIL ENHANCED SMARTPHONE

(71) Applicants: Kenneth Nathaniel Sherman, Santa Barbara, CA (US); Uwe Kummerow, Palo Alto, CA (US)

(72) Inventors: Kenneth Nathaniel Sherman, Santa Barbara, CA (US); Uwe Kummerow, Palo Alto, CA (US)

(73) Assignee: Social Microphone, Inc., Palo Alto, CA (US)

( * ) Notice: Subject to any disclaimer, the term of this patent is extended or adjusted under 35 U.S.C. 154(b) by 0 days.

(21) Appl. No.: 14/631,834

(22) Filed: Feb. 25, 2015

Related U.S. Application Data

(60) Provisional application No. 61/944,476, filed on Feb. 25, 2014.

(51) Int. Cl.
*H04M 1/00* (2006.01)
*H04M 1/60* (2006.01)
*H04R 25/00* (2006.01)

(52) U.S. Cl.
CPC .................. *H04M 1/60* (2013.01); *H04R 25/60* (2013.01); *H04R 2499/11* (2013.01)

(58) Field of Classification Search
CPC ............. H04R 25/554; H04R 2499/11; H04R 25/558; H04M 1/72591; H04B 5/0081; H04B 5/0075; G02C 11/06

USPC ............. 455/550.1, 556.1, 575.1, 90.1, 41.1, 455/41.2, 501; 381/312, 317, 331
See application file for complete search history.

(56) References Cited

U.S. PATENT DOCUMENTS

| | | | | |
|---|---|---|---|---|
| 8,462,968 B2 * | 6/2013 | Drader | ............. | H04M 1/72591 381/315 |
| 8,521,239 B2 * | 8/2013 | Hosoi | .................... | G02C 11/06 455/575.1 |
| 8,682,014 B2 * | 3/2014 | Dave | ..................... | H04R 25/50 381/312 |
| 8,706,245 B2 * | 4/2014 | Case | ..................... | H04R 25/43 607/55 |
| 9,131,320 B2 * | 9/2015 | Dave | ..................... | H04R 25/50 |
| 2007/0003088 A1 * | 1/2007 | Lehtola | ................. | H01Q 1/243 381/330 |
| 2012/0321115 A1 * | 12/2012 | Jylanki | ............... | H04B 5/0087 381/331 |

* cited by examiner

*Primary Examiner* — Sonny Trinh
(74) *Attorney, Agent, or Firm* — Aka Chan LLP

(57) ABSTRACT

A smart phone incorporating a T-coil unit is described. Selection between the output of the induction coil(s) of the unit and the analog output of the radio frequency section of smart phone can made by standard switches for the analog output of the smart phone. Alternatively, with control over the amplification of the induction coil output and the analog output of the radio frequency section, and over a comparator which receives both outputs, different modes of operations for the T-coil output and the analog output can be selected for the audio output of the smart phone. The T-coil unit can also be built as a smart phone dongle which notifies the user of the existence of induction loop signals.

4 Claims, 2 Drawing Sheets

T-COIL ENHANCED SMARTPHONE

CROSS-REFERENCE TO RELATED APPLICATIONS

This patent application claims priority to U.S. patent application 61/944,476, filed Feb. 25, 2014, entitled, "T-Coil Inside or Combined with a Personal Communicator," which is incorporated by reference herein for all purposes.

BACKGROUND OF THE INVENTION

The T-coil or Telecoil (for Telephone Coil) is a common hearing aid component that allows hearing aid wearers to hear clearly on the telephone. The T-coil, basically a short coil of wire wrapped abound a metallic core, responds to the same fluctuating magnetic field that drives the speaker in a telephone handset. When it is activated, the hearing aid amplifies the signal from the T-coil instead of amplifying the signal from its microphone. The sound is clearer to the user because the magnetic field from the handset does not contain the extraneous noise picked up by the hearing aid's microphone.

Hearing loops, audio induction loops, or audio-frequency induction loops are systems which engage a user's T-coil to assist the user in hearing. A hearing loop system is a loop of wire or cable, or an array of cable loops, installed around a designated area or a room. Locations where hearing loops are often found include teller windows, drive-ins, and, routinely, large recital halls. The loop or loops create a magnetic field from an electronic sound source, such as a microphone, a video player, a TV, a telephone, and, indeed, any sound system. The magnetic field contains the same sound information as does the voice coil driving the speaker in a telephone handset, but over a wider area for people with T-Coils in their hearing aids.

According the NIH, "an estimated 17 percent of American adults report having some form of hearing loss. Nearly half of adults ages 75 years and older have hearing loss." The NIH estimates that only 1-in-5 people who need hearing aids use them. And, of course, almost everyone has trouble hearing in noisy environments or large spaces like theatres and classrooms. Public address and sound reinforcement systems help, but hearing aids used with hearing loop systems are superior. And, hearing loop systems are becoming more common every day.

A device which is also becoming more common among the general public is the smart phone. Besides providing a mobile telephone, the smart phone provides entertainment to the user, i.e., games, video, sound recordings, etc., a connection to the Internet with the ability to send and receive data over that network with the ensuing features attached to the Internet, and a host of other functions. The cost of a smart phone, typically hundreds of dollars, is much less than that of a hearing aid, typically thousands of dollars, making a smart phone much more economically available. A boon to the growing population of the elderly and other people with hearing impairments is the incorporation of the T-coil into the smart phone. Furthermore, the incorporation should not interfere with the existing functions and abilities of a smart phone.

BRIEF SUMMARY OF THE INVENTION

The present invention provides for a mobile telephone unit incorporating a microcomputer system including operating system and software applications. The mobile telephone unit has a T-coil unit having at least one induction coil, the T-coil unit connected to an audio output of the mobile telephone unit and having the output from the at least one induction coil switchable to the audio output of the mobile telephone unit.

DETAILED DESCRIPTION OF THE INVENTION

Figure 2:
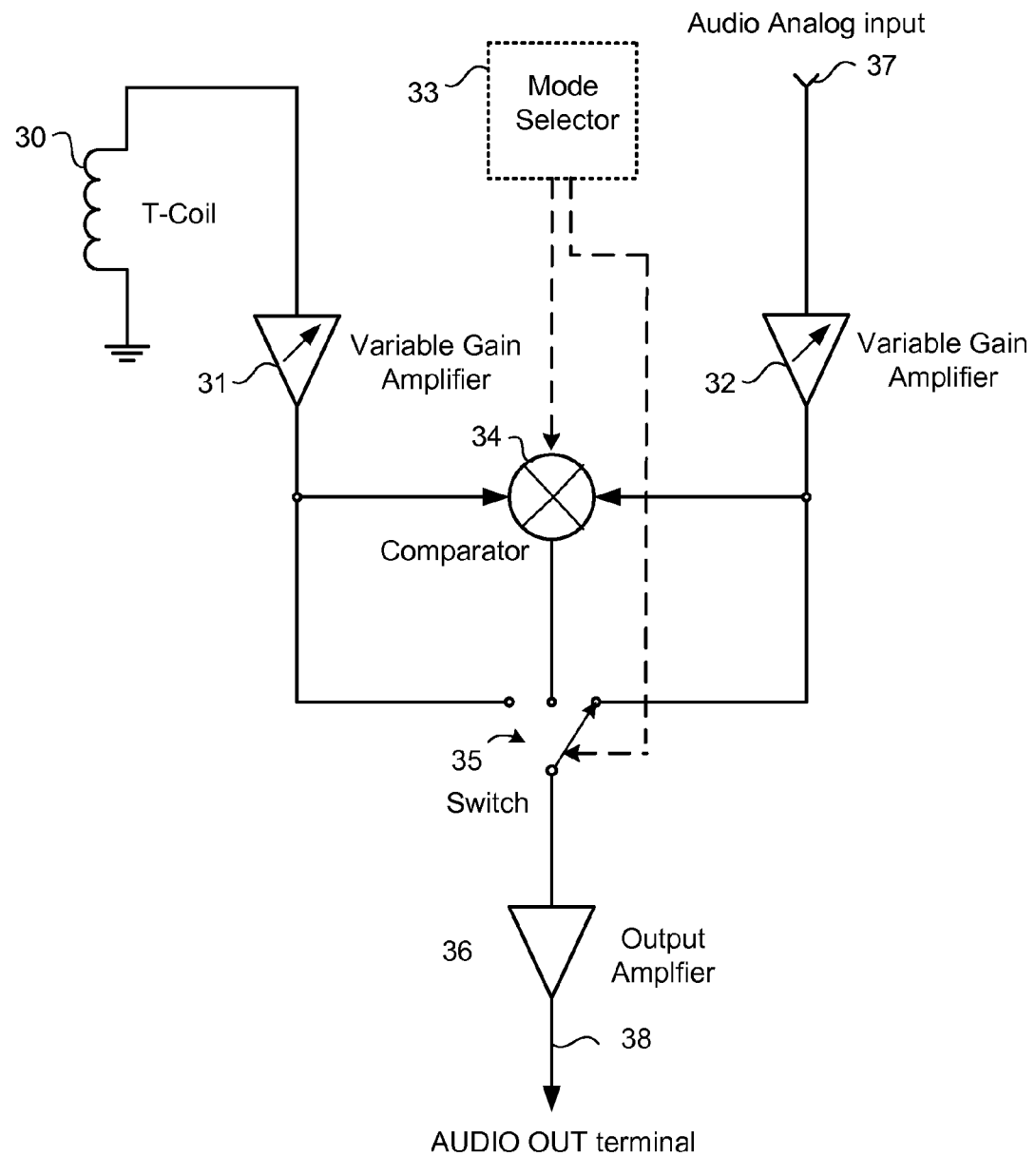
FIG. 2 shows the details of the T-coil unit of FIG. 1.

In an embodiment of the present invention, a T-coil unit 24 is added (shown by a dotted box) as part of the smartphone and is readily adapatable as a smart phone component. The T-coil unit 24 receives the audio output of the analog processing section 12. The output of the unit 24 takes the place of the Audio Out terminal found in a smart phone, i.e., the output terminal which either drives the speaker(s) of the smart phone or a connected headphone. This is shown symbolically in the drawing Though a single inductor is shown in FIG. 2 as representing the T-coil 30, it should be understood that a plurality of inductors perpendicular to each other, or a single inductor mounted on a gimbal so as to be oriented in any direction, could also operate as a T-coil. Such a plurality of inductors or a gimbal-mounted inductor is more likely to have at least one inductor oriented with respect to a hearing loop at a location so as to receive a strong signal. The arrangement avoids the burden of requiring a user orient his or her smart phone to have a good listening experience; the user can simply carry the smartphone in the most comfortable position. The inductor(s) of the unit 24 match the parameters and operation of a T-coil or telecoil defined by the TIA (Telecommunications Industry Association), a U.S. standards organization associated with international standards organizations. More specifically, the parameters and operation of a T-coil are defined by the TIA-1083 standard.

This patent application claims priority to U.S. patent application 61/944,476, filed Feb. 25, 2014, entitled, "T-Coil Inside or Combined with a Personal Communicator," which is incorporated by reference herein for all purposes.

This invention relates to audio systems and to so-called smartphones, mobile telephones incorporated with a microcomputer system including operating system and various applications.

Other objects, features, and advantages of the present invention will become apparent upon consideration of the following detailed description and the accompanying drawings, in which like reference designations represent like features throughout the figures.

Figure 1:
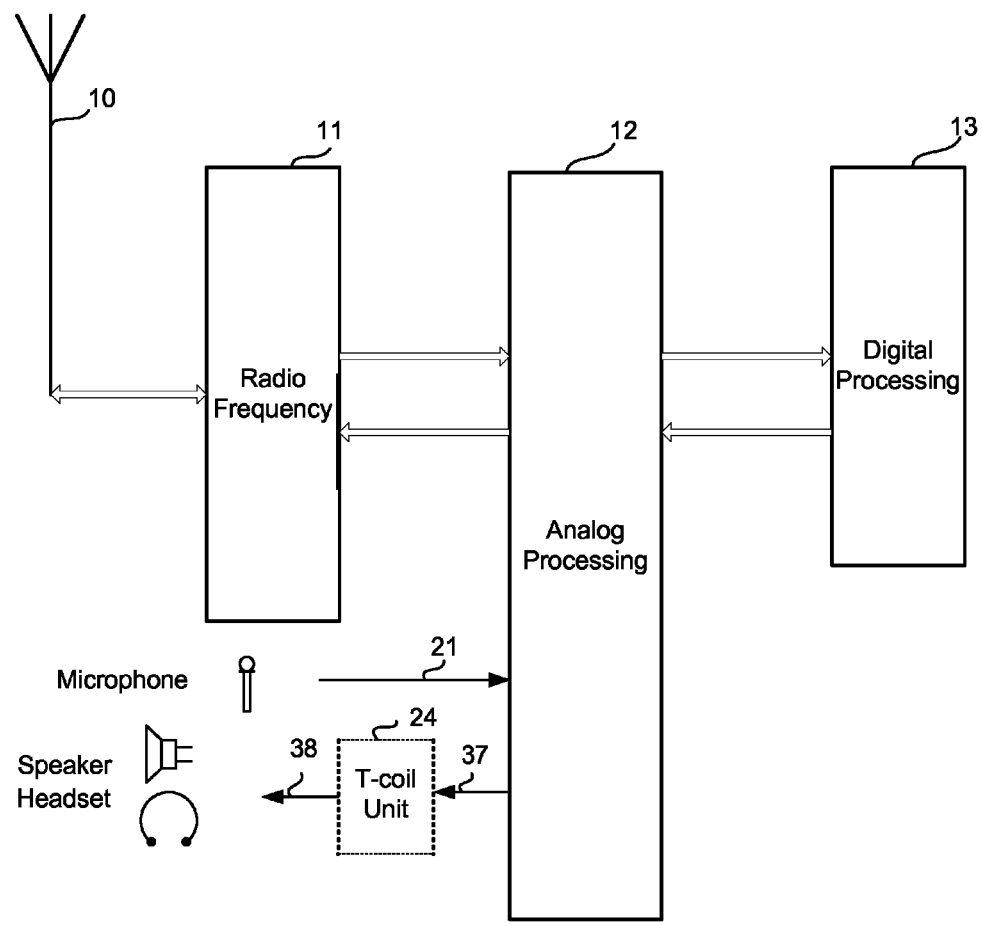
FIG. 1 shows an organization of a smartphone with a T-coil unit according to one embodiment of the present invention.

FIG. 1 illustrates the general circuit architecture of a smart phone with a T-coil unit, according to one embodiment of the present invention.

FIG. 2 shows a block diagram of the T-coil unit of FIG. 1, according to one embodiment of the present invention.

FIG. 1 illustrates the general architecture of a present day smartphone. The smartphone has an antenna 10 (or antenna system) which is capable of receiving and transmitting signals over a variety of wireless network technologies, such as cellular telephone systems (e.g., CDMA, WCDMA, EDGE, LTE, etc.) and others of shorter broadcasting range (e.g., WiFi, Bluetooth, NFC, etc.). The antenna 10 is connected to the other main components of the smartphone, a radio frequency section 11, an analog processing section 12 and a digital processing section 13. Each one of these sections is complex with many components. The following description touches only lightly upon these sections since advantageously the present invention does not require a severe modification of a smartphone.

The radio frequency section 11 includes the transmitter and receiver circuits, filter circuits and power circuits necessary to transmit and receive the RF (radio frequency) signals for the variety of wireless networks over which a smartphone is required to communicate today. Received RF signals are passed to the analog processing section 12 which contains analog-to-digital converters (ADCs) to convert the RF analog signals into the digital signals which are passed to the digital processing section 13. Digital signals from the digital processing section 13 are passed to RF section 12 which also contains digital-to-analog converters (DACs) to convert the digital signals to RF signals. The RF signals are then passed to the transmitter circuits of the radio frequency section 11 for transmission by the antenna 10. The passage of signals between the antenna 10 and sections 11-13 are represented by the broad arrows in FIG. 1.

At this level of description, there are components which are not shown in the sections 11-13 which are well-known to practitioners in the art. For example, the analog processing section 12 typically has a control component which handles the input and output of analog and digital signals, a power management and distribution system which supplies the correct voltages and currents to different parts of the smartphone from a smartphone battery, and a charging system which is responsible for the charging of the battery when the smartphone is connected to an external power source. The section 12 also has an audio coder/decoder component which processes the analog and digital signals received and transmitted through a microphone, headset microphone, speakers, etc. FIG. 1 illustrates these elements representationally.

The digital processing section 13 typically has a digital signal processor (DSP), a general purpose processor, such as a microcontroller unit (MCU), and memory to handle the smartphone communication signals. The MCU instructs the DSP to decode received signals from the analog processing section 11 and to encode signals to be sent to the analog processing section 11 for transmission according to a particular selected wireless network technology. The digital processing section 13 also has an application processor with an operating system to support a graphic user interface (GUI) and related features, such as web browsing, games, email, games, other forms of multimedia entertainment, and other applications, sometimes called "apps." The application processor also has modules typically implemented in hardware to handle multimedia computation for decoding pictures (e.g., JPEG) for viewing on the smartphone screen or encoding pictures taken by the smartphone camera for transmission or storage, or for decoding/encoding video (e.g., MPEG), or to handle audio signals for a player (MP3) or to encode/decode voice signals, and modules to allow the smartphone to communicate with various wireless networks, i.e., the cellular telephone networks, and others, such as WiFi, Bluetooth and NFC.

The output from the T-coil 30 is sent to an automatic variable gain amplifier 31, the output of which is sent to a comparator 34 and a switch 35. An input terminal 37 carrying the customary audio analog signals for the smartphone, i.e., the RF signals from the radio frequency section 11 into the analog processing section 12 in the basic architectural diagram of FIG. 1, is also connected to the input of a second automatic variable gain amplifier 32, the output of which is sent to the comparator 34 and the switch 35. The two amplifiers 31 and 32 attempt to boost, enhance and equalize the strength of the audio signals from the T-coil 30 and the audio input line in the smart phone. The output of the comparator 34 is also sent to the switch 35 which selects the output from the two automatic variable gain amplifiers 31 and 32, and the comparator 34. The comparator 34 compares the two audio signals from the T-coil 30 and from the audio input to the amplifier 32 and can act as a mixer, audio enhancer and differentiator as described below. Upon receiving signals from the inductor 30 and amplifier 31, the comparator 34 can also be used to send a signal to the MCU of the digital processing section 31 so that user of the smart phone can be informed of a functioning induction loop at the location by either an audio signal or a display on the smart phone. This feature avoids the need of a user to constantly test for induction loop locations.

The comparator 34 and switch 35 are under control of a mode selector 33 shown by dotted lines in FIG. 2. The output of the switch 35 is sent to an output amplifier 36 which conditions its output signals to match the requirements of the Audio Out terminal 38 of the smart phone for the user's listening.

The present invention allows different operational modes with the signals from the T-coil 30. Mode selection as represented by the mode selector 33 can be performed by traditional switches, but a programmable I/O port from the MCU in the digital processing section 13 can be used as well. Of course, the desired operation could be hardwired. In such a case the signals from the T-coil 30 works on a separate DSP path for optimum processing of the T-coil signals. Returning to the mode selection shown in FIG. 2, there are three possible modes:

1) Default mode: The comparator 34 acts as a simple switch of the audio signals. In response to control by the mode selector 33, the comparator 34 selects the T-coil output whenever the strength of those signals reaches a certain level with respect to the strength of the audio analog signals through the amplifier 32. The strength of the audio analog signals are used as a reference. Whenever the T-coil receives a sufficiently strong signal, the T-coil output is the default output of the smart phone, i.e., the comparator 34 sends the T-coil signals to the output amplifier 36 with strong T-coil signals. All other modes need software/app support. A smart phone in this mode would allow the user to listen the music at a concert hall with an induction loop system in straight forward manner.

2) Priority switch mode: If the original audio signal from the smart phone, i.e., the signals from the audio input terminal 37 received by the automatic variable gain amplifier 32, contains valuable information, e.g., ring tones, or there is any audio information like Bluetooth or WiFi audio, the output is switched to the audio signal which has the highest priority. This is best implemented with software/app support through the MCU in the digital processing section 13. The user in the concert hall might have his T-coil enhanced listening interrupted by a cellular call, for example.

3) Mixing mode: In this mode, the comparator 34 operates as a mixer. If the original smart phone audio signal contains any information which is important to the user, the comparator 34 mixes both audio sources, i.e., the T-coil 30 and the audio input 37, into one set of signals. Software controls the mixing balance between the sources to select whichever signal is stronger. The mixing balance can be precisely controlled by the software controls not only on the settings on the automatic variable gain amplifiers 31 and 32, but also values upon the comparator 34 acts. With the mixing mode, a user can be in effect listen to both the T-coil source and the audio input source at the same time. Returning to the user in the concert hall, the software control can set the T-coil source in the background and an voice in an important telephone call in the foreground, for example.

The audio signals from the T-coil 30 are selectively sent to the Audio Out terminal of the smart phone. With headphones plugged into the terminal, for example, the user can listen to the sound being sent through the T-coil. With the different modes, other audio signals can also be sent through the Audio Out terminal.

It should be noted that T-coil unit 24 highly modular and self-contained requiring no great changes in the circuitry of the smart phone. It is readily adapatable into a smart phone. By the same token, it can built as a separate unit, such as a dongle, and connected to the smart phone.

In summary the described T-coil unit can flexibly handle different streams of analog signals, including the signals from the T-coil 30. The incorporation of the T-coil unit 24 into a smart phone adds an important function to that ubiquitous device of modern life. At least among the hearing-impaired, including the elderly, a T-coil enhanced smart phone simplifies This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A mobile telephone unit incorporating a microcomputer system including operating system and software applications comprising:

a T-coil unit having at least one induction coil, the T-coil unit connected to an audio output of the mobile telephone unit and having its output from the at least one induction coil switchable to the audio output, and further comprising:
        a comparator receiving output signals from the at least one induction coil and signals from an audio analog line in the mobile telephone unit; and
        a switch receiving the output signals from the at least one induction coil, signals from an audio analog line in the mobile telephone unit and output signals from the comparator, the switch responsive to control signals selecting output signals from the at least one induction coil, the audio analog line in the mobile telephone unit or from the comparator to the audio output of the T-coil unit.

2. The device of claim 1 wherein the T-coil unit further comprises:

a first automatic variable gain amplifier amplifying the output signals from the at least one induction coil to the comparator and switch; and
    a second automatic variable gain amplifier amplifying the signals from the audio analog line in the mobile telephone unit to the comparator and switch.

3. The device of claim 2 wherein the T-coil unit further comprises:

a plurality of induction coils, each induction coil oriented perpendicularly to at least one other induction coil.

4. The device of claim 2 wherein the T-coil unit further comprises:

a gimbal upon which the at least one inductor is mounted so that the inductor is rotatable to maximize the strength of received magnetic signals.

\* \* \* \* \*